Dec. 15, 1964     R. T. VER HALEN     3,161,040
GASKET TESTING DEVICE
Filed June 11, 1962                        3 Sheets-Sheet 1
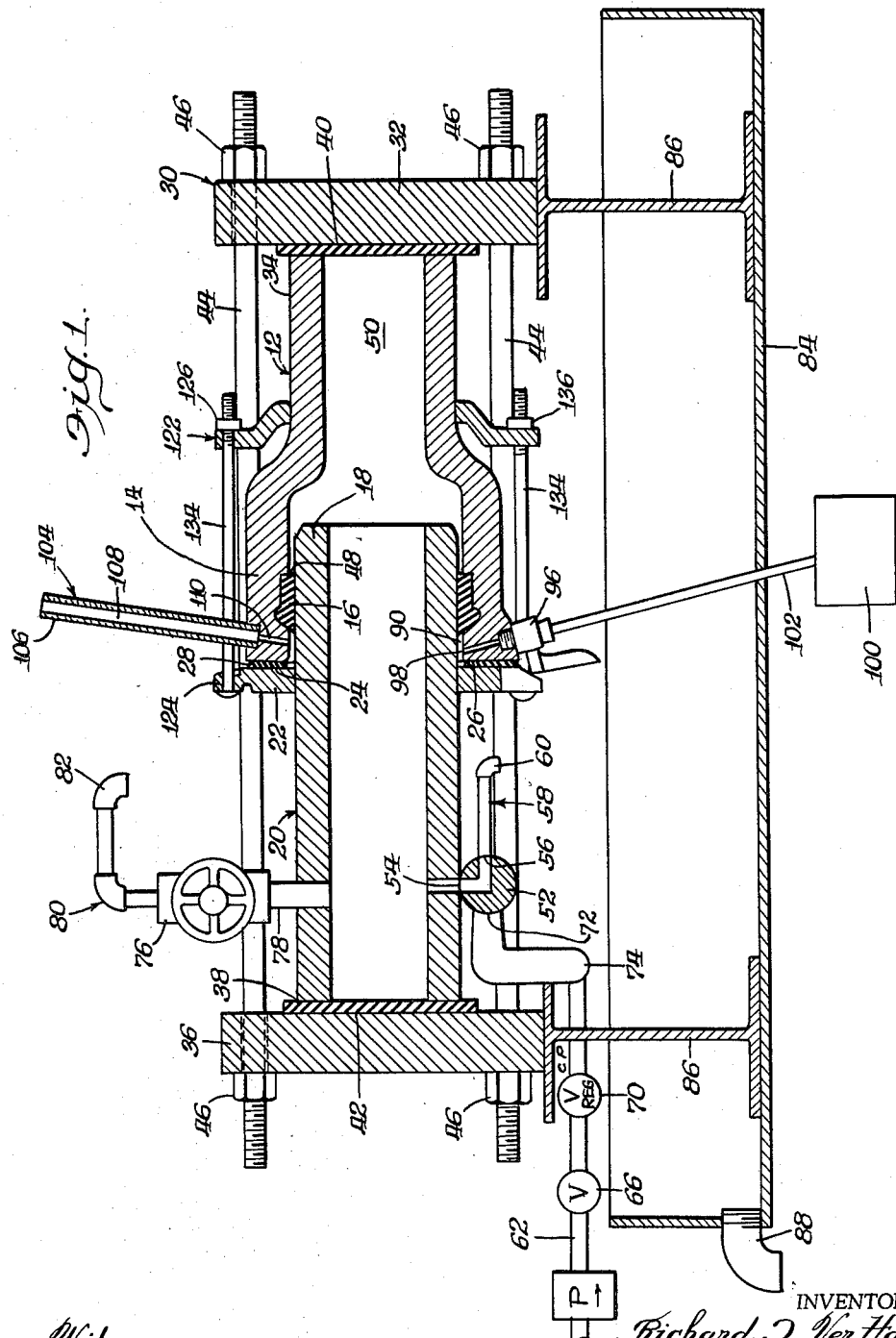
INVENTOR.
Richard T. Ver Halen
BY Walter T. Schlegel, Jr.
Atty.
Witness:
Robert O. Veete

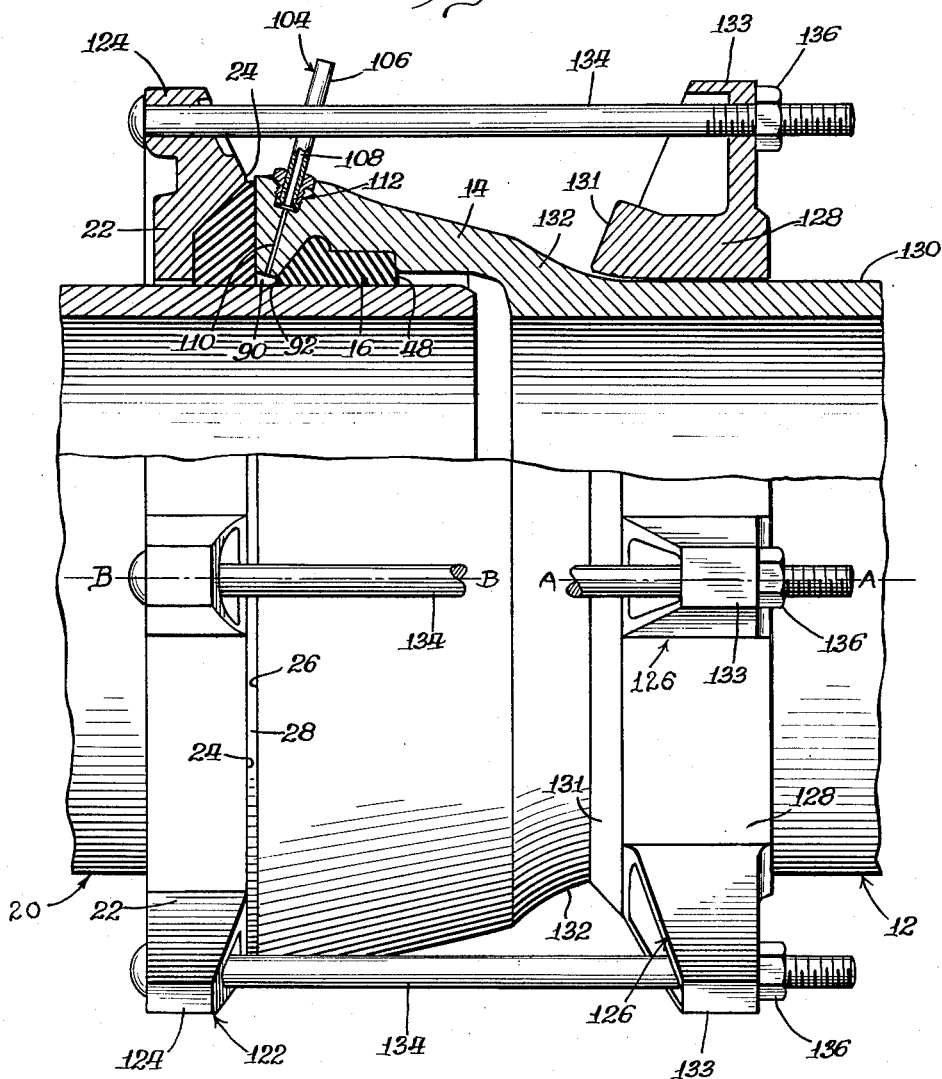

Dec. 15, 1964 R. T. VER HALEN 3,161,040
GASKET TESTING DEVICE
Filed June 11, 1962 3 Sheets-Sheet 3
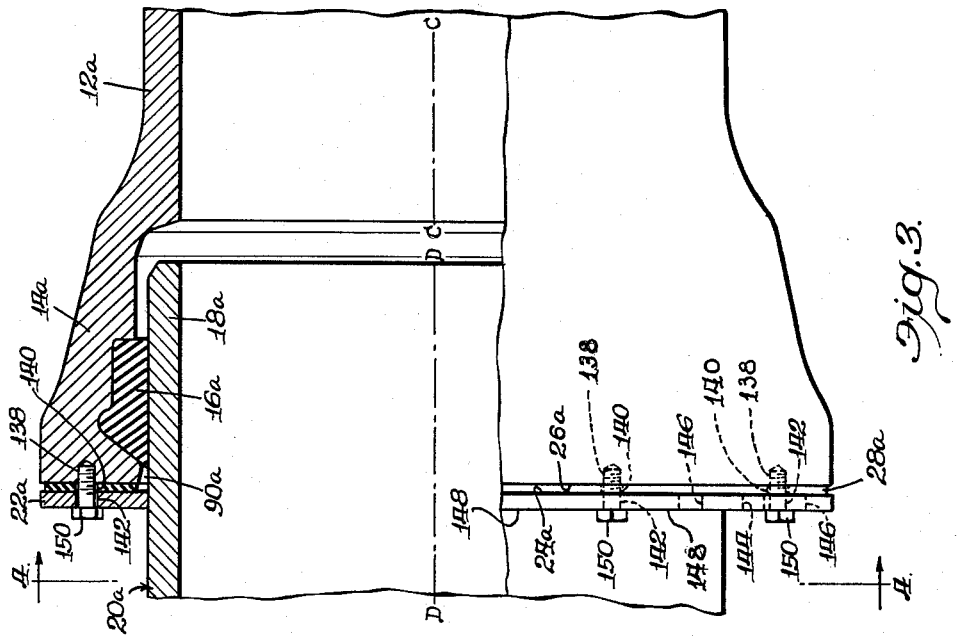
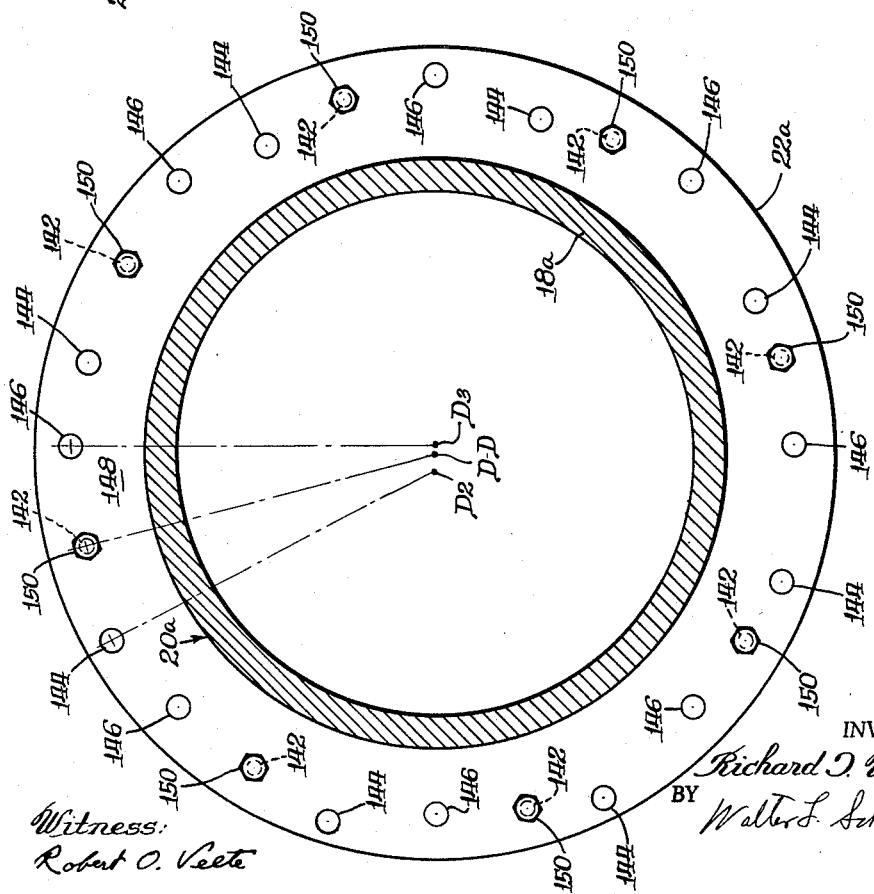
INVENTOR.
Richard T. Ver Halen
BY Walter L. Schlegel, Jr.
Atty.
Witness:
Robert O. Veete

United States Patent Office 3,161,040
Patented Dec. 15, 1964

3,161,040
GASKET TESTING DEVICE
Richard T. Ver Halen, Forest Park, Ill., assignor to Amsted Industries Incorporated, Chicago, Ill., a corporation of New Jersey
Filed June 11, 1962, Ser. No. 201,472
6 Claims. (Cl. 73—46)

This invention relates generally to method and means for testing gaskets and more particularly to method and means for testing pipe gaskets.

A general object of this invention is to provide a method and means of testing pipe gaskets under various conditions experienced in actual use.

Another object of the invention is to provide a means of testing pipe gaskets that will be non-destructive to the gasket while under test.

A further object of the invention is to provide a means for testing pipe gaskets under varying pressures within the joined pipes.

Other objects and advantages will be obvious to one skilled in the art from the following drawings and specification wherein:

FIGURE 1 is a fragmentary sectional view, partially in vertical section of portions of a gasket testing device which embodys features of this invention;

FIGURE 2 is an enlarged, fragmentary sectional side view of structure illustrated in FIGURE 1 to more clearly show detail therein;

FIGURE 3 is a modified form of the structure shown in FIGURE 2; and

FIGURE 4 is an end view of the structure shown in FIGURE 3.

It will be understood that certain elements have been intentionally omitted from certain of the views where these elements are shown to better advantage in another view.

Referring now in detail to the drawings, and particularly to FIGURE 1, there will be seen a pipe gasket testing device including a first pipe member, generally indicated at 12, having a pipe bell end 14. A gasket 16 to be tested is seated in its conventional manner within the bell end 14. The test gasket 16 is compressed between said bell end 14 and a spigot end portion 18 of a second pipe member, generally indicated at 20, telescoped therein.

Pipe member 20 is provided with an abutment ring 22 slidably received around the outer periphery of pipe member 20. The ring 22 presents a recessed abutment surface 24 facing the spigot end portion 18. The bell end 14 of pipe member 12 is provided with an end annular surface 26. An annular resilient sealing gasket 28 is provided between the abutment surface 24 and annular surface 26. The gasket 28 fits snugly around the periphery of pipe member 20 to provide an effective seal between surfaces 24 and 26 and also between ring 22 and pipe member 20. The depth of telescoping engagement of the spigot end portion 18 of the pipe member 20 into the bell end 14 of the pipe member 12 is limited by the engagement of abutment surface 24 and annular surface 26 with opposite sides of the sealing gasket 28 therebetween. Means provided to secure the pipe ends together are described hereinafter.

The telescoped pipe members 12 and 20 and other structure hereinafter described, are supported by a framework, generally indicated at 30, including a first end plate 32 disposed adjacent to the open end 34 of pipe member 12 and a second end plate 36 disposed adjacent to open end 38 of pipe member 20. An end gasket 40 is disposed between the open end 34 of member 12 and the first end plate 32, and a second end gasket 42 is disposed between the open end 38 of member 20 and the second end plate 36. The end plates 32 and 36 present mutually facing, preferably square surfaces. A tension rod 44 is disposed to slideably extend through end plates 32 and 36 inwardly from each of the corresponding corners of each plate, substantially as shown. The tension rods 44 may be threadably engaged at each end thereof to a securing nut 46. When the securing nuts 46 are turned down against plates 32 or 36, the gaskets 40 and 42 are simultaneously compressed by plates 32 and 36 against the open ends of pipe members 12 and 20 to seal their open ends.

The interior walls of the telescoped members 12 and 20, end gaskets 40 and 42, and the inward side 48 of the test gasket 16 substantially define a pressure chamber 50 to receive a fluid under relatively high pressure therein.

A three way valve 52 is provided with an orifice 54 extending into the bottom of member 20 to communicate with chamber 50. Outlet opening 56 of valve 52 is preferably connected, through pipe assembly 58, that terminates in an elbow 60 having its open end facing downwardly. Fluid in the chamber 50 may be drained therefrom by positioning valve 52 so as to permit the fluid to pass through orifice 54, and outwardly through opening 56, and elbow 60. Fluid to fill chamber 50 is provided by a pressurized fluid supply line 62 having a shut off valve 66. Line 62 is connected to the inlet of a constant pressure outlet valve regulator 70. The output of regulator 70 is connected to inlet opening 72 by means of conduit 74. Valve 52 may be positioned to permit fluid to flow into opening 72 and out of orifice 54 into chamber 50.

Regulator 70 may be adjusted to provide various test pressures for the fluid in chamber 50, such as integral steps of 100 lb. p.s.i. over the pressure range required. It is understood, of course, that this arrangement to provide a source of pressurized fluid is by way of example only, and any other suitable means may be provided.

A shut-off valve 76 is provided having an end communicating with the top of chamber 50 through nipple 78. The opposite side of valve 76 is preferably connected to a pipe assembly 80 that terminates in an elbow 82 having its open end facing downwardly.

Valve 76 is normally opened during filling of the chamber 50 by fluid from orifice 54. This permits the air within the chamber 50 to move outwardly through elbow 82. After the chamber 50 is filled, the fluids will start to flow through said elbow 82 and thereafter the valve 76 may be closed. When the fluid is being drained from chamber 50, valve 76 may be reopened to facilitate passage of air into the cavity 50 to displace the fluid therein.

The framework 30 may be disposed over an open tank 84 by providing a pair of support beams 86 that support end plates 32 and 36, thereabove. Elbow 60 and 82 are disposed vertically above the open tank 84 so that fluid flowing therefrom will be collected by the tank 84. A conduit 88 is provided having one end communicating with the lower end of the tank and the other end open to a suitable drain (not shown), permitting all fluid collected to drain therefrom.

Gaskets 16 and 28 define with spigot end portion 18 and bell end 14, an annular chamber 90. A second shut-off valve 96 is threadably engaged into bell end 14 and communicates with the bottom of chamber 90 through passageway 98. Valve 96 is connected to a source of fluid 100 through a conduit 102.

As best seen in FIGURE 2, volumeter 104 may include a substantially vertically disposed open ended glass tube 106 having a central opening 108 therethrough. The lower end of opening 108 communicates with an opening 110 in bell end 14. Opening 110 extends downwardly so as to communicate with annular chamber 90. Glass tube 106 may be secured in sealed engagement with the bell end 14 by any suitable means, such as a packing gland, generally designated at 112. Glass tube 106 may be provided with a graduated scale generally located centrally thereon to indicate a change of volume within chamber 90 by a change of liquid level in tube 106. Any convenient graduated scale may be used, such as cubic inches or cubic centimeters.

As best seen in FIGURE 2, annular chamber 90 is sealed at opposite ends by means of a clamping arrangement, generally designated at 122. Abutment ring 22 is provided with preferably 6 substantially equally spaced lugs 124 extending radially outward therefrom. A ring clamp, generally designated at 126, is provided with an annular portion 128 adapted to slidably engage an outer annular surface 130 of member 12, adjacent to bell end 14. Annular portion 128 is provided with an outwardly flared portion 131, that is engageable with an inward end 132 of bell end 14. Annular portion 128 is further provided with 6 equally spaced lugs 133 extending radially outward therefrom preferably to substantially the same height as lugs 124 on abutment ring 22. A draw bolt 134 is adapted to pass centrally through each of the lugs 124 on ring 22 and also through the corresponding radially aligned lug 133 on annular portion 128. Each draw bolt 134 is provided with nut 136, and when the nuts 136 are tightened, bell end 14 and abutment ring 22 are urged against opposite sides of the sealing gasket 28 as hereinbefore described.

Members 12 and 20 may be secured together by the clamping arrangement 122 so that axis A—A of member 12 and axis B—B of member 20 are axially aligned, as shown in FIGURE 2. It is also possible to secure the pipe members 12 and 20 so that axis A—A and B—B intersect at an angle. Such angular displacement of joined pipe is experienced in actual use of pipe to negotiate a curve or a change of elevation of a pipe line. The clamping arrangement 122 also accommodates testing when the axis A—A is parallel to but offset from axis B—B.

The pipe members 12 and 20 may be secured in an aligned relationship during the clamping process by turning nuts 136 onto draw bolts 134, equally, so as to cause substantially uniform compression of the sealing gasket 28. To secure the pipe in an angular relationship, on the other hand, the nuts 136 are drawn onto bolts 134, unequally so as to cause one half of the gasket 28 to be compressed, or deformed, more than the opposite half, in the direction of angular displacement, thus causing the joined members to angle toward the draw bolts drawn down furthest.

A modified form of the clamping arrangement is shown in FIGURES 3 and 4. A first pipe member 12a is provided with a bell end 14a. The test gasket 16a is seated within the bell end 14a in a conventional manner and so compressed between said bell end 14a and a spigot end portion 18a. Pipe member 20a is provided with an abutment ring 22a preferably welded around the outer periphery of member 20a and presents an abutment surface 24a facing the spigot end portion 18a. Bell end 14a of pipe member 12a is provided with an end annular surface 26a. A sealing gasket 28a is provided between the abutment surface 24a and annular surface 26a.

Annular surface 26a is provided with, for example, 8 threaded blind holes 138 that extend substantially parallel with member 12a, central axis C—C. Blind holes 138 are preferably spaced radially outwardly, equal distances from axis C—C and are equally spaced angularly around the central portion of surface 26a. Sealing gasket 28a is provided with openings 140 therethrough communicating with openings 138 in bell end 14a.

As best seen in FIGURE 4, abutment ring 22a is provided with a plurality of holes comprising sets 142, 144 and 146. Each hole communicates with abutment surface 24a and ring end surface 148. The first set of 8 holes 142 has each hole spaced equi-distantly from central axis D—D of member 20a. Pipe member 20a may be positioned with respect to member 12a as shown in FIGURES 3 and 4, so that holes 142 through abutment ring 22a will be aligned with blind holes 138 in the bell end 14a. A mounting nut 150 is provided for each of the 8 aligned holes. It should be noted that when members 12a and 20a are so joined, that holes 138 and 142 are aligned and secured and the axis C—C and D—D will be substantially concentric. In this position, the spacing between the telescoped spigot end 18a and the bell end 14a will be substantially uniform, therefore the compressive forces on the test gasket 16a therebetween will be substantially uniform throughout.

As best seen in FIGURE 4, the second set of 8 holes has each hole 144 spaced equi-distantly from an eccentric point D2, that is offset to one side of axis D—D. The third set of 8 holes has each hole 146 spaced equi-distantly from eccentric point D3 that is offset on the side opposite point D2 with respect to axis D—D.

As best seen in FIGURE 4, after removal of mounting nuts 150, member 20a may be rotated approximately 15° clockwise and then moved horizontally a distance equal to the offset between axis D—D and point D2 so that holes 144 becomes aligned with openings 138 in the bell end 14a whereafter mounting nuts 150 can be replaced in holes 144. Member 20a will then be offset with respect to member 12a by a distance equal to the offset of axis D—D and point D2. The joined members 20a and 12a may also be offset with respect to each other by rotating the member 20a approximately 15° counterclockwise instead of clockwise then moving it a distance equal to that between axis D—D and point D3 so that holes 146 become aligned with openings 138 in the bell end whereafter mounting nuts 150 may be placed therethrough in holes 146.

Displacing the pipes axially within the testing device causes a non-uniform deformation of the test gasket 16a to simulate a condition that occurs in pipeline construction. Point D2 is offset from axis D—D a greater distance than point D3 to produce two different degrees of offset. It is understood, of course, that more than two offsets could be used by the addition of more sets of holes in abutment ring 22a.

In operation, after preassembling the test gasket 16 or 16a and securing pipe members 12 and 20, as shown in FIGURE 2 or as members 12a and 20a in FIGURE 3, the assembly is sealed by blocking the open ends 34 and 38 with end plates 32 and 36 as hereinbefore described. The two way valve 96 is opened, permitting a fluid from source 100 to enter through conduit 102 and fill chamber 90 and to rise in opening 108 to a reference point on the graduated scale of glass tubing 106. The valve 96 is then closed.

Next, valve 76 and valve 66 are opened and three way valve 52 is positioned to permit fluid from line 62 to fill chamber 50. After the chamber 50 is filled, the fluid will fill valve 76 and begin to flow from elbow 82. Thereafter, valve 66 and then valve 76 are closed resulting in chamber 50 being filled with fluid and sealed at substantially zero pressure.

It is necessary to produce a fluid pressure inside the chamber 50, which will react upon the back surface 48 of test gasket 16 that will produce a degree of extrusion of the same. Regulator 70 is adjusted so as to produce a minimum desired pressure on the fluid in chamber 50. Valve 66 is then reopened and regulator 70 is activated so as to produce an increased pressure on the fluid, preferably in incremental steps of 100 pounds p.s.i., until they have reached the maximum test value. As the gasket 16 or 16a begins to extrude into chamber 90 or 90a under increasing pressure force, the fluid within chamber 90 will begin to rise in opening 108 of the glass tubing 106 above the reference point to give a visual indication of total cubic displacement of the gasket 16 or 16a, through extrusion. The pressure within chamber 50 may be held relatively constant until stable conditions seem to prevail. This stability condition can be ascertained by any liquid level rise in the glass tubing 106.

Should a leak of the pressurizing fluid within the chamber 50 penetrate into the fluid in chamber 90, the level of the fluid within chamber 90 would continue to rise. In order to ascertain a small leak around the test gasket 16, one of the two fluids may be colored so as to indicate a color change in the fluid in tubing 106. Upon completion of testing, the pressure of the fluid may be released by regulator 70, valve 66 closed, valve 76 opened, and valve 56 positioned to permit the fluid in chamber 50 to flow from elbow 60 into tank 84. Conduit 102 may be removed from valve 96 whereafter the valve 96 may be opened to permit fluid within chamber 90 to drain into tank 84. The fluid therein may drain therefrom through conduit 88.

Although only two basic embodiments of the invention have been disclosed and described, it is apparent that other modifications are possible within the scope of the appended claims.

I claim:

1. An arrangement for testing sealing gaskets comprising a first pipe member having a bell end; a second pipe member partially received within said bell end; a ring portion formed closely about said second pipe member so as to be generally radially disposed thereabout; a resilient seal positioned between said ring portion and the extreme end of said bell end; a ring clamp slidably engaging the outer annular surface of said first pipe member, said ring clamp being abuttable with said bell end; retaining means interconnecting said ring portion and said ring clamp to urge said ring portion and said extreme end of said bell end against said resilient seal, said retaining means being disposed annularly about said joined pipe members, said retaining means being adjustable to permit the pipe members to be joined in axial alignment or so that the axis of said pipe members intersect at an angle, said test sealing gasket being disposed between said first and second pipe members; means forming a first chamber within said joined pipe members, said first chamber communicating with one side of said sealing gasket; means for admitting test pressure to said first chamber; means defining a second chamber with the opposite side of the gasket; a fluid filling said second chamber and means responsive to changes of the volume of said fluid in said second chamber for indicating distortion of said gasket by changes in the test pressure.

2. An arrangement for testing sealing gaskets comprising a first pipe member; a second pipe member partially received within said first pipe member, said sealing gasket being compressed between said pipe members; a first abutment surface formed on said first pipe member; a second abutment surface formed on said second pipe member; a resilient seal disposed between said first and second abutment surface; retaining means to compress said resilient seal between said first and second abutment surfaces, said retaining means being adjustable to retain said joined pipe members axially or so that their axes intersect at an angle; means for admitting test pressure to the interior of the pipes acting on one side of the sealing gasket; means defining a sealed chamber with the opposite side of the sealing gasket; a fluid filling said chamber and means responsive to change of the volume of said fluid in said chamber for indicating distortion of said gasket by changes in the test pressure.

3. In an arrangement for testing sealing gaskets comprising a first pipe member, having a bell end; a second pipe member partially received within said bell end; a ring portion rigidly secured about said pipe members so as to be generally radially disposed thereabout; a resilient seal positioned between said ring portion and the extreme end of said bell end; a plurality of threaded openings in said extreme end of said bell end, said threaded openings being equally spaced around said extreme end and located substantially equidistantly from the axis of said first pipe member, said resilient seal having a plurality of openings therein, said openings in said resilient seal communicating with said threaded opening; a plurality of sets of openings in said ring portion, each of said sets having individual openings disposed radially about a common axis, each of said sets of openings having said individual opening axially alignable with said threaded openings, each of said common axis having a different offset with respect to the axis of said second pipe member so that said pipe members may be joined with a different offset between their axes when aligned with each of the sets of openings; a plurality of bolts adapted to be received in said aligned openings and to urge said ring portion and said extreme end of said bell end against opposite sides of said resilient seal; a test gasket under compression between said pipe members; means for admitting test pressure to the interior of the pipes acting on one side of the sealing gasket; means defining a sealed chamber with the opposite side of the sealing gasket; a fluid filling said chamber and means responsive to change of the volume of said fluid in said chamber for indicating distortion of said gasket by changes in the test pressure.

4. In an arrangement for testing sealing gaskets comprising a first pipe member telescoped over a second pipe member; a first abutment means radially disposed about said first pipe member; a second abutment means radially disposed about said second pipe member; a resilient gasket disposed between said first and second abutment means; a test gasket disposed between said telescoped pipe members; retaining means for retaining the axis of one of said pipe members in axial alignment with the axis of the other of said pipe members and in a plurality of preselected positions between said axes, said test gasket being subjected to unequal compressive forces around said telescoped pipe members when said retaining means is positioned in an offset position; means for admitting test pressure to one side of the sealing gasket; means defining a sealed chamber with the opposite side of the sealing gasket; a fluid filling said chamber; and means responsive to change of the volume of said fluid in said chamber for indicating distortion of said gasket by changes in the test pressure.

5. In a device for testing a sealing gasket under compression between telescoping sections of pipe, means for admitting a first liquid to the interior of said pipes acting on one side of the gasket, means for admitting test pressure to the interior of said pipes, means radially aligned with the telescoping sections of the pipe defining a sealed chamber with the opposite side of the gasket, a second liquid filling said chamber, one of said liquids being colored and means to indicate a change of color of said second liquid caused by leakage of said first liquid around said test gasket from the interior of said pipes to said sealed chamber when said test pressure is applied.

6. A method of testing a sealing gasket compressed between a pair of telescoped pipes wherein a chamber is formed on the outward side of the sealing gasket and a volumeter communicates with the chamber, the steps of: filling the chamber with a fluid until it rises to a reference level within the volumeter, opening a breather port means communicating with the atmosphere and the upper part of the interior of the telescoped pipes, opening an inlet port and filling the joined pipe with a fluid until all of the air therein has been displaced by the fluid flowing thereinto, closing the inlet port means and the breather port means, applying a test pressure to the fluid within the telescoped pipes and observing the change of volume within the chamber by a rise of the fluid within the volumeter, above the reference level.

References Cited in the file of this patent

UNITED STATES PATENTS

| | | |
|---|---|---|
| 1,090,737 | McDonald | Mar. 17, 1914 |
| 1,708,731 | Macfarlane | Apr. 9, 1929 |
| 1,796,489 | Sturke | Mar. 17, 1931 |
| 2,573,646 | Koestering | Oct. 30, 1951 |
| 2,663,183 | Huhn | Dec. 22, 1953 |
| 2,951,363 | Diodene | Sept. 6, 1960 |

FOREIGN PATENTS

| | | |
|---|---|---|
| 625,592 | Great Britain | June 30, 1949 |